April 24, 1934.     F. N. HALLETT ET AL     1,955,850
LENS SYSTEM
Filed Sept. 28, 1926     2 Sheets-Sheet 1
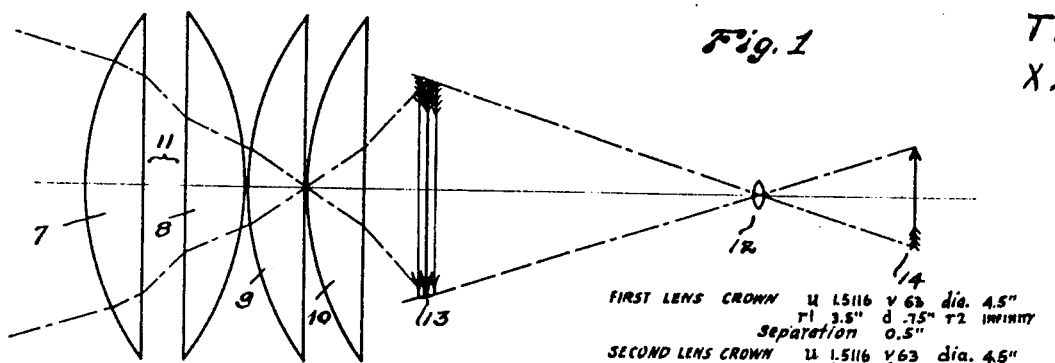
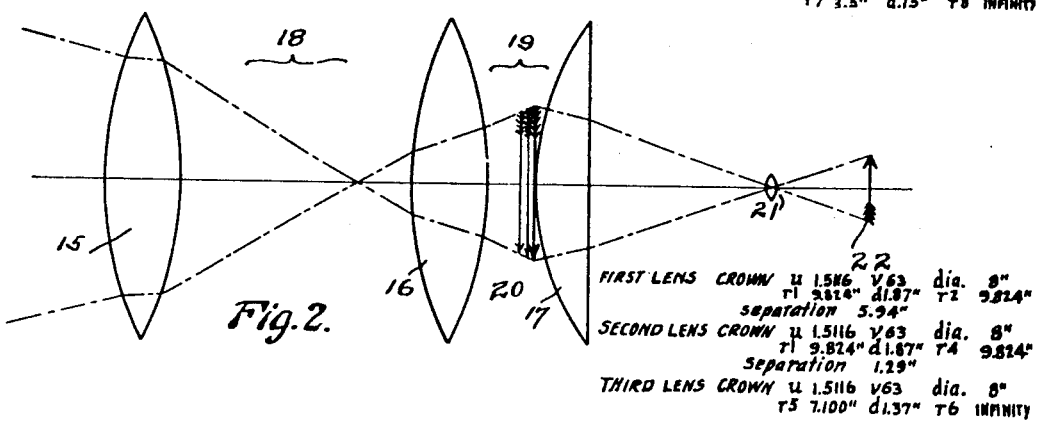
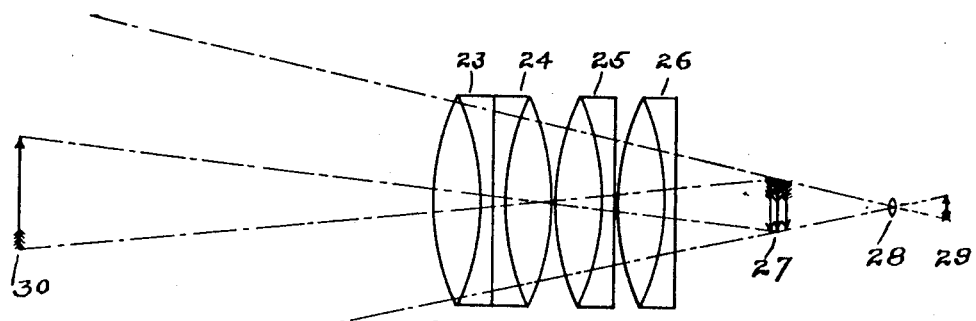
INVENTORS
Fred Norton Hallett
Maurice Phelps Anderson
BY
G. Wright Arnold
ATTORNEY April 24, 1934.  F. N. HALLETT ET AL  1,955,850

LENS SYSTEM

Filed Sept. 28, 1926  2 Sheets-Sheet 2

```
FIRST LENS CROWN   u 1.5116   v 63   dia.  2.25
           r1 3.5"   d .38"   r2 INFINITY
  separation 0.5"
SECOND LENS CROWN  u 1.5116   v 63   dia.  3"
           r3 inf.  d .50"   r4 3.5"
  separation 0.0"
THIRD LENS CROWN   u 1.5116   v 63   dia.  3.75"
           r5 3.5"  d .62"   r6 INFINITY
  separation 0.0"
FOURTH LENS CROWN  u 1.5116   v 63   dia.  4.5"
           r7 3.5"  d .75"   r8 INFINITY
```

INVENTORS
Fred Norton Hallett
Maurice Phelps Anderson
BY
G. Wright Arnold
ATTORNEY Patented Apr. 24, 1934

1,955,850

UNITED STATES PATENT OFFICE 1,955,850

LENS SYSTEM

Fred Norton Hallett and Maurice Phelps Anderson, Seattle, Wash., assignors to Stereoscopic Camera Company, Seattle, Wash., a corporation of Washington Application September 28, 1926, Serial No. 138,230

4 Claims. (Cl. 88—57)

Our invention relates to a lens system. More particularly, our invention relates to a lens system which may be employed in photography for producing a three dimensioned real image of the object to be photographed, and then photographing said real image.

The art of terrestrial photography differs fundamentally from that of astronomical and microscopic photography. In both the astronomical and the microscopic arts, the object is in one photographic plane—at least for practical purposes it may be so regarded. A one plane object is afforded in both astronomical and microscopic photography, and hence a one plane image results. In terrestrial photography the object is in innumerable photographic planes, and since the object is stereoscopic, an accurate reproduction thereof should likewise be stereoscopic in effect.

For purposes of clearness and illustration, our invention will be described as applied to the exacting requirements of the moving picture field of photography, but our invention is not to be considered limited to any such specific application but as co-extensive in all fields where like problems and like conditions obtain in whole or part. In the field of still pictures, a picture of superior quality results by means of our invention, characterized by its depth of focus and stereoscopic effect.

In motion picture photography it is necessary to make sixteen or more separate and distinct pictures every second. It is, therefore, necessary to use lenses which transmit the maximum amount of light, in order that sufficient light will be passed to make an impression on the photographic film at each distinct exposure. In short, the objective lens must not objectionably reduce the amount of light reaching the photographic film or sensitized recording medium from the object being photographed.

The term "focal depth" is used to refer to the capacity of a lens to focus objects at various distances from the camera on planes in relatively close proximity, i. e., by great focal depth is meant that objects which vary greatly in their distances from the camera will focus on planes very close together. A lens of "shallow focal depth" means that only those objects in relatively close proximity are focused on planes close together. The greater the focal length, or the larger the diameter of the lens in relation to its focal length, the shallower the focal depth, as is well recognized in the art. Manifestly, we have the opposing conditions resulting as follows: The light requirement necessitates a large diameter lens and relatively short focal length, and this in turn means, a lens of shallow focal depth, which is obviously objectionable in the moving picture art. Another term for "focal depth" is "universal focus."

This light requirement therefore means that the ordinary objective lens employed cannot have a great focal depth. The moving picture art has been greatly hampered by reason of this fact, because near objects will not be in focus, while distant objects are, or vice versa. In fact, so pronounced is this difficulty that even the different parts of the face of the subject on a close-up may not be clearly in focus at the same time, unless the opening in the lens is greatly reduced, and this in turn involves the necessity of increasing the amount of light thrown upon the subject. In instances where artificial light is used, this causes "Kleig" eyes and other great personal discomforts to the subjects. A primary purpose of our invention is to overcome this difficulty and provide an objective lens which will be characterized by great focal depth or universal focus and at the same time have a relatively large aperture and great speed, which means there is a minimum of reduction of light received from the object.

Also, in making motion pictures of large objects located near the camera, it is necessary to have what is known as a wide angle lens, and a lens of short focal length. The shortest focal length motion picture lens made today for film of standard size is about 32 mm. On the other hand, for objects located at a distance from the camera lenses of extremely long focal length are necessary, if the objects are to be made to appear of the desired and required size in the picture; while, for objects at intermediate distances, lenses of intermediate lengths are required. For this reason motion picture cameras for professional purposes are usually equipped with three or more lenses of different focal lengths and it is general practice to photograph objects approaching from a distance with a battery of cameras located at different points along the route. A further primary purpose of our invention is to provide an objective which will overcome the above difficulties, and which will permit of photographing any objects, regardless of size or distance from the camera in such a way that the final image can be made of any desired size by means of but one optical system which may be quickly adjusted to any focal length desired.

Motion pictures as now made undertake to represent objects of three dimensions and this they do on a flat screen of but two dimensions, so that it is difficult to judge how far back of one object another may be. In short, motion pictures of today are characterized by an absence of the well known stereoscopic effect, an essential factor to impart that customary "naturalness" to the picture. Briefly, the problem presented was to obtain an image as though formed by a lens of short focal length by a combination of lenses, each of which is of large diameter and of a long focal length. This is done in our invention for the purpose of providing an image of substantial depth or thickness, but of relatively small proportions, thereby making it possible to employ a second element which has a relatively much larger eye spread as respects the image formed, since same is kept small, as just explained, than the first element as respects the object itself, thereby providing for magnifying the stereoscopic effect, which means that the pictures are much more life-like, as they are thus given a three-dimension character as opposed to a plane surface character. A primary purpose of our invention is to provide a picture characterized by this stereoscopic effect, and this magnified as desired.

In general, we attain the objects of our invention by providing a three-dimensioned-real-image-producing first element, said element being characterized by having an eye spread for ordinary purposes of a lens which is not of a less diameter than the pupillary distance of the human eyes, and having a short focal length, so that a relatively small image is formed having all lines in the image parallel to corresponding lines in the object; and then providing a second element which will form a final or photographic real image, (i. e., one substantially in the same plane) of said three-dimensioned image, said second element having an eye spread preferably relatively as to the image much greater than the first element bears to the object.

To produce an image substantially in the same plane as heretofore known requires a lens corrected for spherical aberration at the center of the field, coma, astigmatism of oblique pencils, curvature of plane of the image, distortion and color. To do this in a lens of the dimensions (diameter and focal length) herein set forth (i. e. of large diameter and short focal length) for the first element is recognized and considered as a physical impossibility. By our invention of producing an image which is not in one plane, and of photographing it with a second element which is corrected for the above enumerated errors, we have discovered it is not necessary to make these well established and recognized corrections in our first element with the exceptions only of distortion and curvature of field of the image. This discovery is very important in our invention.

One fundamental basis or requisite characterizing our invention obtains in the production of a non-photographic first image, (one having three dimensions) of the object by the first element, and the use of this as the basis of further photographing. Heretofore, none but a photographic image, (one forming an image substantially in the same plane), has been thought operable. Our three-dimensioned first image is one that cannot be received in its entirety upon a screen (i. e. a semi-transparent medium of substantially no thickness such as a ground glass or ground celluloid).

On the other hand, speed and stereoscopic effect are two fundamental factors necessary in the invention which we are aiming to provide. Heretofore, the fastest lens known that could be used in photography is f 1.5, i. e., in the "F" system, or has had a relation of diameter to focal length as 1:1.5. A primary purpose of our invention is to provide a lens which is a plurality of times faster than any known lens heretofore designed. In our experimental work, without any definite attempt, as yet, to establish any maximum limit, the speed of a camera embodying our invention amounted to nine times the maximum heretofore produced, i. e., entirely fast enough for all purposes as now recognized.

The image produced by the first element ordinarily according to present practice must be very bright in the moving picture field particularly. In other words, there must be only a minimum reduction of light going from the object through the lens,—the aperture must be of such size as to permit the direct transfer of all the light possible from the object. (Obviously, cutting down this aperture would reduce the light and hence, the speed). Having a big aperture means that the lens itself must be large, and heretofore no lens of sufficient size embodying the necessary corrections has been discovered. It has been thought heretofore that any lens used as the first image forming element must have all the six photographic corrections hereinabove referred to. In fact, our invention provides a lens of such size but without all the said photographic corrections that there is an actual increase in the image produced of the light received from the object itself, as the same is concentrated upon a very small area. Therefore, our invention proceeds positively in the opposite direction from the teaching heretofore obtaining, and use may be made of a lens as the first image forming element which is not corrected for all the recognized photographic aberrations.

Another factor militating against employing a large lens as the first image forming element is the long focal length incident thereto, and this in the first instance of course would produce an image relatively large, which would mean dimming the light effect because a given quantity of light would be diffused over a greater area, and therefore would lack the essential element of speed necessary for motion pictures particularly. Again, this long focal length would operate to require a very large camera or a long optical system. In other words, compactness, a fundamental essential in a camera for purposes of convenience and movability, which must characterize a camera designed for terrestrial photography, would be impossible.

Moreover, the providing of a large apertured lens as heretofore designed would normally mean a very large image which would mean the destruction of the stereoscopic effect, as it would destroy the relatively large ratio of the diameter of the second element as respects the image. In short, lenses of the first element must be of large diameter and at the same time produce a small image.

At the present time, the projecting apparatuses in use all require the film to be run from the top down, and, therefore, all moving picture cameras have the film run from the top down. To produce a photograph by photographing the image as herein set forth, requires the film to be run from the bottom up in the camera because if the film were run through the camera in the usual direction, the invention would be exceedingly difficult if not prohibitive, of adaption to commercial use as it would require a re-equipping of the projecting devices in use with specially equipped lenses to properly project the pictures taken by the method of photographing the image. However, we overcome this difficulty by providing for the film to run from the bottom up in the camera,—in other words, just opposite to the practice heretofore obtaining. This provides for the proper sequence of the pictures as well as the proper relation to each other.

The above mentioned general objects of our invention together with others inherent in the same, are attained by the device illustrated in the following drawings, the same being preferred exemplary forms of embodiment of our invention, throughout which drawings like reference numerals indicate like parts:

Figure 1 is a diagrammatic view of the objective consisting of a first and second element embodying our invention;

Fig. 2 is a diagrammatic view of a modified form of the objective consisting of the first and second element embodying our invention;

Fig. 3 is a diagrammatic view of another modified form of objective consisting of the first and second element embodying our invention;

Figure 4:
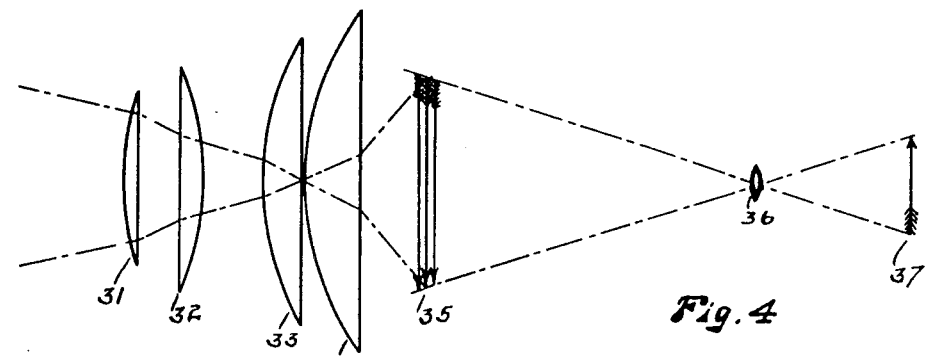
Fig. 4 is a diagrammatic view of a further modified form of objective consisting of the first and second element embodying our invention.

In Fig. 1, an objective constituting the first element is formed of four plano-convex lenses, 7, 8, 9 and 10.

Lenses 7 and 8 are positioned with their convex sides oppositely disposed and in space relation to each other, there being provided the space 11, while the convex surface of lens 10 is disposed against the flat side of lens 9.

The second element, 12, is here diagrammatically represented by a single lens (see Fig. 5 for the ordinary combination of lenses constituting this member) and is a regular photographic positive lens which produces a real image precisely as does the first element. The formula for the first element as shown in Fig. 1 is as follows:—

| First lens | Crown | $u$ 1.5116 $r^1$ 3.5" | $v$ 63 $d$ .75" | dia. $r^2$ | 4.5" infinity |
|---|---|---|---|---|---|
| Separation 0.5" | | | | | |
| Second lens | Crown | $u$ 1.5116 $r^3$ inf. | $v$ 63 $d$ .75" | dia. $r^4$ | 4.5" 3.5" |
| Separation 0.0" | | | | | |
| Third lens | Crown | $u$ 1.5116 $r^5$ 3.5" | $v$ 63 $d$ .75" | dia. $r^6$ | 4.5" infinity |
| Separation 0.0" | | | | | |
| Fourth lens | Crown | $u$ 1.5116 $r^7$ 3.5" | $v$ 63 $d$ .75" | dia. $r^8$ | 4.5" infinity |

This combination gives an image partially corrected for distortion and spherical aberration and produces in space a positive real first image, 13, which is in inverted position as respects the object itself—the dotted lines here and in all the figures represent the path of the rays of light. This image is characterized by having three dimensions (therefore represented by three arrows), and the first element is characterized by being of a very short focal length, so that the first image, 13, is formed relatively close to the first element and well in front of the second element, 12.

The real image, 13, thus formed constitutes the object with respect to the second element, 12, which reproduces the real image 13 in the form of a final or second real photographic image 14—photographic in the sense that it is in one plane. This final real image is thus reproduced upon a film or other sensitized photographic medium.

The lenses composing the first element are characterized by being individually of long focal length. The arrangement of these lenses, however, is such that they have a relatively short resultant focal length so that the first real image 13 is formed close to the first element which means that the image is of relatively small proportions as compared with the image which would normally be formed by one of said lenses individually. It is apparent that the wide aperture provided by the lenses of relatively great size which characterizes the lenses of the first element permits the refracting of the light with the minimum of interference, and as the image formed by the lenses is of a size smaller than the object the light is in reality magnified as the light from the object is condensed upon the relatively small image 13. Herein lies one of the advantages of the lenses being of large size and forming the image of small proportions. Instead of a diminution of the light received from the object, there is in reality a magnifying of the light effect, and, hence this objective is particularly well adapted to the moving picture field.

As already indicated the intensity of the light means that the lenses are of great speed. This renders unnecessary the artificial intensifying of the light upon the object which has heretofore been very objectionable in that it results in the production of Kleig eyes, and other great personal discomfiture of the actors.

The lenses of the first element furthermore by being of relatively great diameter have the advantage as it were of receiving rays of light from all sides of the object excepting those on the side oppositely disposed to the camera. Thus, the lenses have a wide eye-spread so that the image reproduced is of three dimensions, and hence has stereoscopic effect. The size of the lens as a minimum to obtain the stereoscopic effect normal to human eyes, should be equal to the pupillary distance of the human eyes. This minimum is dictated by the desire to have the object possess the normal stereoscopic effect. If the particular purpose for which the picture is to be used does not require the normal stereoscopic effect, manifestly the lenses composing the first element need not have the minimum diameter equal to the pupillary distance of the human eyes.

Insofar as the diameter of the lenses composing the first element are in excess of the pupillary distance of the human eyes, by so much is the stereoscopic effect increased. Hence, the first element is carefully constructed and designed to produce the first image characterized by its having three dimensions. The eye-spread, therefore, of the first lens, as respects the object, is at least equal to and is preferably greater than the eye-spread of the human eyes.

Having thus produced the first image characterized by its smallness of proportions and thereby providing for a well illuminated image, and, further particularly characterized by being of three dimensions, it is manifest that the second element has a relatively greater eye-spread as respects the first image than the eye-spread of the first element as respects the object itself. The smallness of proportions of the image makes it possible for the second element 12 to look further around the object, as it were, that is, to magnify the stereoscopic effect, than can be done by the first element with respect to the object as the size of the object is in the first instance a fixed quantity. Since the second element may thus have a greater eye-spread as respects the real image 13, than the first element as respects the object, we have a magnifying of the stereoscopic effect in the second or final real image 14.

While the first image 13 is in inverted position and right for left and left for right, the second element 12 reverses this image, so that the final image 14 is right side up, right for right, and left for left, with respect to the object itself.

The first image 13, being as explained, relatively small, represents a condensation of the light coming through the lenses.

In Fig. 2, the first element is here illustrated as formed of three lenses, namely, 15, 16 and 17 being in spaced relation having the distance 18 disposed between lenses 15 and 16 and the space 19 disposed between lenses 16 and 17. This arrangement is shown particularly for the purpose of indicating that the first real image, in this figure designated as 20, need not be to the right of the first element, that is, to the right of the last lens 17 of the first element, but may be positioned in front of said last lens composing the first element. The second element 21 forms the final image 22 of photographic character.

The formula for this first element in Fig. 2 is as follows:—

| First lens | Crown | $u$ 1.5116 $r^1$ 9.824" | $v$ 63 $d$ 1.87" | dia. $r^2$ | 8" 9.824" |
|---|---|---|---|---|---|
| | | Separation 5.94" | | | |
| Second lens | Crown | $u$ 1.5116 $r^3$ 9.824" | $v$ 63 $d$ 1.87" | dia. $r^4$ | 8" 9.824" |
| | | Separation 1.29" | | | |
| Third lens | Crown | $u$ 1.5116 $r^5$ 7.100" | $v$ 63 $d$ 1.37" | dia. $r^6$ | 8" infinity |

In Fig. 3 an objective consisting of the first element formed of four achromatic lenses 23, 24, 25 and 26 is illustrated. By this embodiment of our invention we show how the first element may be constructed and corrected for spherical aberration, distortion and color. The formula for this first element is as follows:—

| First lens | Crown | $u$ 1.5116 $r^1$ 9.824" | $v$ 63 $d$ 1.87" | dia. $r^2$ | 8" 9.824" |
|---|---|---|---|---|---|
| | | Cemented | | | |
| Second lens | Flint | $u$ 1.6465 $r^3$ −9.824" | $v$ 37.8 $d$ .50" | dia. $r^4$ | 8" infinity |
| | | Separation 0.0" | | | |
| Third lens | Flint | $u$ 1.6465 $r^5$ infinity | $v$ 37.8 $d$ .50" | dia. $r^6$ | 8" −9.824" |
| | | Cemented | | | |
| Fourth lens | Crown | $u$ 1.5116 $r^7$ 9.824" | $v$ 63 $d$ 1.87" | dia. $r^8$ | 8" 9.824" |
| | | Separation 0.0" | | | |
| Fifth lens | Crown | $u$ 1.5116 $r^9$ 9.824" | $v$ 63 $d$ 1.87" | dia. $r^{10}$ | 8" 9.824" |
| | | Cemented | | | |
| Sixth lens | Flint | $u$ 1.6465 $r^{11}$ −9.824" | $v$ 37.8 $d$ .50" | dia. $r^{12}$ | 8" infinity |
| | | Separation 0.0" | | | |
| Seventh lens | Crown | $u$ 1.5116 $r^{13}$ 9.824" | $v$ 63 $d$ 1.87" | dia. $r^{14}$ | 8" 9.824" |
| | | Cemented | | | |
| Eighth lens | Flint | $u$ 1.6465 $r^{15}$ −9.824" | $v$ 37.8 $d$ .50" | dia. $r^{16}$ | 8" infinity |

It will be noted that the resultant focal length of the first element is longer than in the two preceding illustrations; in other words, the first image, herein designated as 27, is relatively larger than in the preceding illustrations. This in turn requires that the second element 28 must be further removed from the first image in order to produce the final or second image 29 of the prescribed size suitable for the moving picture art (it being understood that the art itself determines the size of the picture required). The object 30 represents the object to be photographed. For ordinary purposes, this form of our invention is less to be desired as it is too cumbersome and of too large a size.

Because of the long focal length, a large diameter of the components of the front element is necessary in order that sufficient field or angle of view may be included by the second element in the process of photographing the first image. The embodiment of our invention thus including corrections for color in the first element has the disadvantage above indicated, namely, those disadvantages incident to long focal length incident to which arises the cumbersomeness and the great weight of the camera. In overcoming these objections we have made the discovery that it is unnecessary to make corrections for color, that is, it is only necessary to make corrections for distortion and spherical aberration. This makes possible the simple construction illustrated in Figs. 1 and 2.

In Fig. 4, an objective constituting the first element is formed of four plano-convex lenses 31, 32, 33 and 34 of which the first is of relatively small diameter and the others successively larger until the fourth lens is of the same diameter as the fourth lens in Fig. 1. In fact this figure illustrates an objective of approximately the same focal length and other optical qualities as the first element illustrated in Fig. 1, with the difference that it will not transmit as much light as the objective in Fig. 1 because of the reduction in size of some of the components. Such a lens functions in our invention but would not have as much stereoscopic effect due to the lack of eye-spread on the first component of the first element. The formula for this element is as follows:—

| First lens | Crown | $u$ 1.5116 $r^1$ 3.5" | $v$ 63 $d$ .38" | dia. $r^2$ | 2.25" infinity |
|---|---|---|---|---|---|
| | | Separation 0.5" | | | |
| Second lens | Crown | $u$ 1.5116 $r^3$ inf. | $v$ 63 $d$ .50" | dia. $r^4$ | 3" 3.5" |
| | | Separation 0.0" | | | |
| Third lens | Crown | $u$ 1.5116 $r^5$ 3.5" | $v$ 63 $d$ .62" | dia. $r^6$ | 3.75" infinity |
| | | Separation 0.0" | | | |
| Fourth lens | Crown | $u$ 1.5116 $r^7$ 3.5" | $v$ 63 $d$ .75" | dia. $r^8$ | 4.5" infinity |

The first real image 35 is herein reproduced by the second element 36 to form the final image 37.

Figure 5:
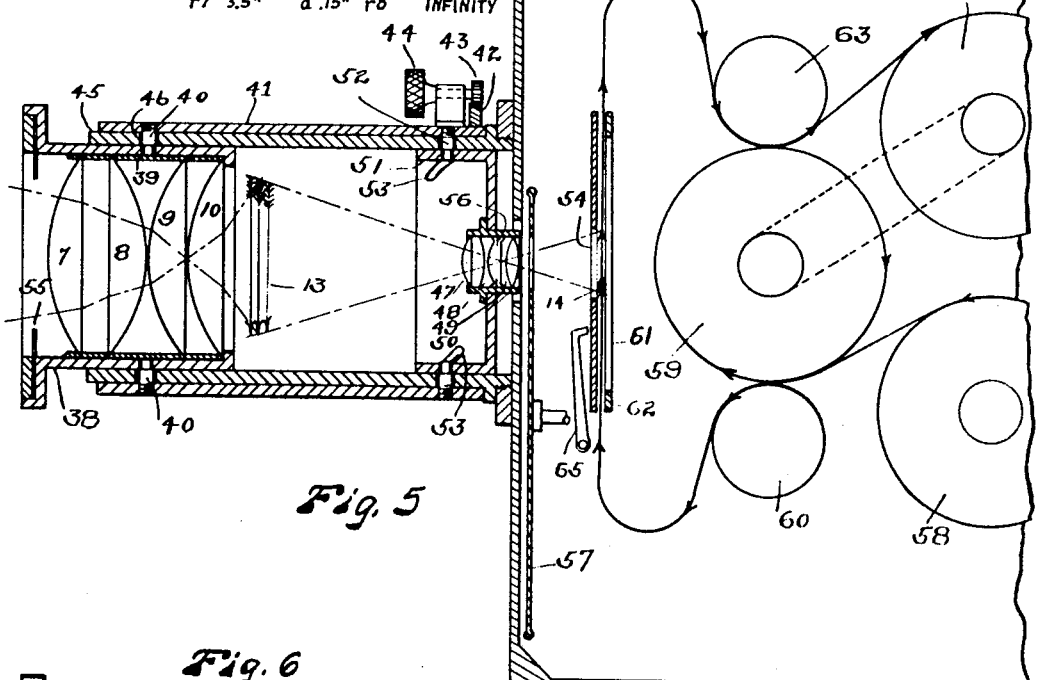
Fig. 5 is a view in longitudinal cross-section of a camera embodying our invention.
Figure 6:
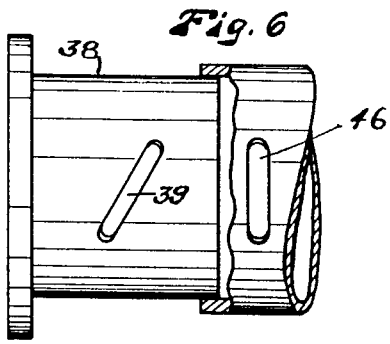
Fig. 6 is a view in perspective of a detail of said camera.

The above is one method of reducing the amount of light, namely, by reducing the size of the forward lenses of the first element, and another way of adjusting the amount of light is to use either of the iris diaphragms shown in Fig. 5. Manifestly the location of the iris diaphragms in Fig. 4 could be directly in front of lens 31, or it might be positioned in front of lens 32, or any other convenient lens.

It will be distinctly understood that these four formulæ are only concrete illustrations of lenses, and the arrangements for the embodiment of our invention. Optical engineering can readily devise many other lens formulæ in accordance with our invention which will produce a three-dimensioned real image. In short, the lens formulæ given may be varied almost infinitely, without departing from our invention, the formulæ set forth being merely concrete exemplifications.

In Fig. 5 is illustrated a moving picture camera embodying our invention. The first element having lenses 7, 8, 9 and 10, the identical lenses of Fig. 1, are mounted in a sleeve 38 which has spiral slots 39 in which pins 40 rigidly fixed in the outer sleeve 41 travel. Thus, when the outer sleeve 41 is revolved by means of the rack 42, pinion 43, and thumb screw 44 the first element is given a forward or backward movement. The sleeve 45 in which sleeve 38 is mounted is provided with annular slots, 46, that is, one slot for each pin, said slots being disposed at right angles to the axis of the sleeve. Likewise the second element diagrammatically shown on Fig. 1 as number 12, is composed of lenses 47, 48, 49 and 50 mounted in a sleeve 51 which in turn is actuated by means of pins 52 and spiral slots 53 exactly as is the first element, thus, when the pinion 43 is turned the sleeve 41 moves both the first and second elements. The pitch of the slots 39 in the sleeve 38 and the sleeve 51 bear such a relation to each other that the final or photographing image 14 is always cast on the film aperture 54 sharply in focus. This arrangement is provided in order that the operator of the camera may quickly adjust the contrivance to any focal length desired without going through the process of focusing the object on the film, in order to provide a picture of the required proportion for the film.

Iris diaphragm 55 is used to reduce the amount of light reaching the film as may be desired. Iris diaphragm 56 in the second element may be used for a like purpose.

A disk shutter 57 of the ordinary type is disposed immediately to the rear of the second element. Behind this is diagrammatically illustrated the parts of the well-known moving picture mechanism for operating the film, that is on the roll 58, the unexposed film is located and the film then passes under the sprocket wheel 59 which is oppositely disposed to the idler wheel 60, and then the film in a free loop passes through an aperture plate 61 which has the well-known guide members 62. From this aperture plate the film passes to the mechanically driven sprocket wheel 59 against which it is held by the idler wheel 63 then to the exposed film or take up reel 64. The film is moved across the aperture plate by the claw 65 which operates (actuating mechanism not shown) to push the film upward at times when the shutter disk 57 cuts off the light from the second element. The take-up reel 64 is connected by a belt to the sprocket wheel 59 which is operated by the well-known hand crank (not shown).

The mode of operation of our invention is as follows:—

The operation has already been set forth in large measure in connection with the particular description of the figures. It will be manifest in Fig. 5 that our invention is characterized by having a focal length that may be very readily changed and adapted to the requirements of the object. It is manifest that in order to keep the final image 14 of the prescribed size the second or rear element 12 must be moved with respect to the first real image 13 to keep the same in proper proportion and in proper focus. We have found that a considerable change in the size of the final image is possible without any change in the position of the final image on the optical axis.

In considering these drawings it should be remembered that while the image formed by the first element is indicated by arrows, it is in reality an image of three dimensions and is of such a character that it could not be received on a sensitized medium or viewed on the screen. It exists in space only, that is, in an infinite number of planes. The depth of this image it will be remembered will vary with the distance of the objects from the front lens. Obviously, while this image is disposed in space and is three dimensioned, this image must be relatively compact to permit of its being photographed. This same idea is expressed when it is said above that the first element must be of short focal length which provides for universal focus and a three dimension image which is compact, i. e. of such shallow depth or thickness in the direction of the optical axis that it can be focused by the second element.

For focusing with the second element for photographic purposes in accordance with our invention, however, the depth of the real image (13) formed by the first element is negligible, so that no matter what the distance from the first element to the object may be it will be accurately focused on the film by the second element, because the second element depends for its focus upon the distance from the first image to the second element. Hence, it is apparent that the second element lens is thus entirely able to be focused properly upon the real image in which the objects actually vary (as between themselves) by a relatively great distance and would not be able to be thus focused upon the said objects themselves. Thus, this optical combination once adjusted is always in focus regardless of the distance of the objects from the camera, and is in fact of universal focus regardless of the size of the apertures of either element.

Briefly, it may be said that there are three determining points or factors, the position of the first element, the second element, and the film. If one of these positions is changed another must be changed as well in order to keep the film in the focal plane of the final real image. For matters of convenience we choose to move the first and second elements as already described when we wish to vary the size of the object being photographed without varying the distance of the object from the camera. As different focal lengths are necessary in motion picture photography for different subjects, depending on their distance from the camera and their size, in order that they may be readily viewed on the screen, this invention accomplishes this purpose with but a single optical system, whereas heretofore it has been necessary to use a number of different lenses of different focal lengths, stopping to change from one lens to another and to focus each different lens on the film each time it is used. As explained we eliminate such replacement of lens entirely and accomplish the focusing automatically.

The universal focus feature which characterizes our invention is very important. The absence of focal depth or universal focus is manifest in pictures on the screen at the present time when "close up" pictures of an actor are shown. In such cases the background is very blurred, if not entirely foggy or indistinct so that in comparison with a picture of our invention, it seems flat and unnatural.

By reason of the fact that our invention provides for universal focus, it is possible to have the feature of varying the size of the subject or object in the picture, i. e., what is known in the moving picture art as "zooming". By this, is meant that without moving either the camera or the object, simply changing the focal length of the system of lens embodying our invention, it is possible to obtain the same result on the film of increasing or decreasing in size the object precisely as if the object itself were moved to or from the camera or the camera to or from the object. The providing of this feature is of the greatest importance in the moving picture industry, because it avoids the necessity of resetting the camera, refocusing and relighting as is the present practice with great delay. When it is remembered that the entire corps of operators, including high salaried artists and technicians, are idle during this time, the saving is manifest when the "close ups" are employed as extensively as at present. In our invention, the change of the said focal length is accomplished simply by turning the screw 44 which operates to move the front element and the rear element 12 proportionately so that while the image 13 is moved the image 14 is either increased i. e. "zoomed", or it is decreased, depending upon whether or not the image 13 is moved to or from the rear element, that is, element 12. It will be understood that while the front element is moved, the location of the image 13 with respect to said front element is substantially constant.

It will be understood that the resultant focal length of the optical system which includes both the first element and the second element determines the size of the photographic or second or final image and angle of view. More in detail, the camera of our invention produces a final or photographic image on the film by photographing the first image. If the size of an object in the final image on the film is to be increased, the second element must be moved towards the first element. In so moving the second element the position of the final image will be moved out of the plane of the film. To avoid this, we combine a movement of the first element with a movement of the second element in such a way that the final image is always kept in the plane of the film. Therefore, since the focal length of the first element is a fixed quantity and produces an image of a predetermined size located in a fixed relation to the first element, it is only necessary to vary the position of the second element with respect to the said first real image in order to change the size of the resultant final image. In order to change the position of the first real image obviously it is necessary to move the first element. The mechanism hereinabove described manifestly automatically changes the two in proper relation to each other (the pitch of the spiral slots bearing such proper relation to each other) to keep the focus of the resultant final image in the plane of the film.

Manifestly where lenses of very short focal length are desirable for purposes of photographing a wide angle of view, the limit set as to the shortest focal length which can be used is determined by the proximity of the lens to the film as all motion picture cameras are made in such a way that the shutter mechanism is operated between the lenses and the film. Heretofore, the shortest equivalent focus which has been used on motion picture cameras of standard size is 32 mm. With our device we have successfully used an equivalent focus of only 15 mm. This is possible because the optical center of our system when the lenses are adjusted for a short equivalent focus is thrown well back of the rear component of the second element, thus leaving room for the shutter mechanism to operate. Furthermore with our invention it is possible to secure any focal length desired, that is, it may be increased or decreased by a millimeter at a time so that the object may be made to fit the film without any minor approaching or receding from the object with the camera. According to present practice the cameras are ordinarily equipped with lenses having focal length 32 mm, 40 mm, 50 mm and 60 mm, that is, four lenses are supplied and no provision is thus made for intermediate focal lenses. In our device from the above description we clearly provide a mechanism which gives all the intermediate focal lengths by one optical system.

Furthermore, our invention provides for a lens characterized by being of a very short focal length and at the same time, of very great speed; in other words, a lens which will transmit a large amount of light as compared to other photographic lenses, because the light is concentrated on a small area without any diminution in the diameter of the lens.

Obviously changes may be made in the form, dimensions and arrangement of the parts of our invention, without departing from the principle thereof, the above setting forth only a preferred form of embodiment.

We claim

1. A device of the character described embodying a three dimensioned real image producing positive element having an eyespread not less than that of a lens of a diameter not less than the pupillary distance of the human eyes and of relatively short focal length, whereby a real image of relatively small proportions is produced having spacial effect, and a second positive element having a relatively greater eyespread with respect to said real image than said first element with respect to the object to be reproduced, said second element being operatively disposed with respect to said real image, whereby a photographic or final image is produced of said real image.

2. A device of the character described embodying a front element consisting of the following four lenses:

| First lens | Crown | $u$ 1.5116<br>$r^1$ 3.5" | $v$ 63<br>$d$ .75" | dia.<br>$r^2$ | 4.5"<br>infinity |
|---|---|---|---|---|---|
| | | Separation 0.5" | | | |
| Second lens | Crown | $u$ 1.5116<br>$r^3$ inf. | $v$ 63<br>$d$ .75" | dia.<br>$r^4$ | 4.5"<br>3.5" |
| | | Separation 0.0" | | | |
| Third lens | Crown | $u$ 1.5116<br>$r^5$ 3.5" | $v$ 63<br>$d$ .75" | dia.<br>$r^6$ | 4.5"<br>infinity |
| | | Separation 0.0" | | | |
| Fourth lens | Crown | $u$ 1.5116<br>$r^7$ 3.5" | $v$ 63<br>$d$ .75" | dia.<br>$r^8$ | 4.5"<br>infinity | and a second standard photographic positive lens.

3. A photographic device of the character described embodying a three dimensioned real image producing positive element having a relatively short focal length, whereby a real image of relatively small proportions having spacial effect is produced; a slidable mounting for said element; a second positive element operatively disposed with respect to said real image, whereby a photographic image is produced of said real image; a slidable mounting for said second element; a common means mounting both of said slidable element mountings; and a selectively operable actuating device connected to each of said slidable element mountings and moving simultaneously said slidable element mountings towards or away from each other, whereby the scale of the size of the objects in the photographic image may be rapidly varied, and the position of the focal plane of the second element maintained.

4. A device of the character described embodying a first positive element composed of a plurality of relatively long focal length individual lenses, said lenses being positioned in operative relation, whereby the resultant focal length of the first element is relatively short and a real image having relatively small proportions, relatively small depth, and spacial effect is produced; and a second positive element having a diameter relatively greater with respect to said real image than the diameter of said first element is with respect to the object being reproduced, said second element being operatively disposed with respect to said real image, whereby a photographic or final image is produced of said real image.

FRED NORTON HALLETT.
MAURICE PHELPS ANDERSON.